(12) United States Patent
Lindoff et al.

(10) Patent No.: US 6,842,476 B2
(45) Date of Patent: Jan. 11, 2005

(54) CO-CHANNEL INTERFERENCE CANCELLER

(75) Inventors: Bengt Lindoff, Lund (SE); Niklas Stenström, Helsingborg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 724 days.

(21) Appl. No.: 09/779,553

(22) Filed: Feb. 9, 2001

(65) Prior Publication Data

US 2002/0159547 A1 Oct. 31, 2002

(51) Int. Cl.⁷ ............................................. H04L 27/30
(52) U.S. Cl. ................. 375/144; 375/148; 375/346; 370/319; 455/63; 455/278.1; 455/296
(58) Field of Search ................ 375/144, 148, 375/346; 370/319, 442, 465, 466; 455/63, 222, 226.1, 226.3, 278.1, 283, 276, 307

(56) References Cited

U.S. PATENT DOCUMENTS

| | | | |
|---|---|---|---|
| 5,222,101 A | * | 6/1993 | Ariyavisitakul et al. .... 375/231 |
| 5,317,323 A | | 5/1994 | Kennedy et al. |
| 5,838,742 A | | 11/1998 | Abu-Dayya |
| 5,933,768 A | * | 8/1999 | Skold et al. ................. 455/296 |
| 5,937,015 A | | 8/1999 | Dent et al. |
| 6,151,487 A | | 11/2000 | Kim et al. |
| 6,167,081 A | | 12/2000 | Porter et al. |
| 6,223,040 B1 | * | 4/2001 | Dam .......................... 455/447 |
| 6,256,486 B1 | * | 7/2001 | Barany et al. ............... 455/296 |

FOREIGN PATENT DOCUMENTS

| | | |
|---|---|---|
| WO | WO01/45289 A1 | 6/1991 |
| WO | WO96/11533 | 4/1996 |
| WO | 98/38750 | 9/1998 |
| WO | WO98/38750 | 9/1998 |
| WO | 98/59443 | 12/1998 |
| WO | WO02/23742 | 3/2002 |

OTHER PUBLICATIONS

J. Proakis, "Digital Communications", McGraw–Hill, Inc., New York, 1995, pp. 539–586.
Pekka A. Ranta et al., "Interference Cancellation by Joint Detection in Random Frequency Hopping TDMA Networks", pp. 428–432.

* cited by examiner

Primary Examiner—Dac V. Ha
(74) Attorney, Agent, or Firm—Potomac Patent Group, PLLC

(57) ABSTRACT

A method and apparatus for processing a received signal containing a desired burst and a co-channel interferer burst are disclosed. The invention includes receiving the received signal from a front end receiver. A time offset between the desired burst and the co-channel interferer burst is detected. A detection procedure is then selected based on the time offset between the desired burst and the co-channel interferer burst. Preferably, one of three detection procedures is selected based on the time offset detected and optionally the signal strength of the co-channel interferer burst. If a first or second time offset is detected, then a joint detection or an iterative detection procedure is selected and performed, respectively. Finally, if a third time offset is detected or if the co-channel interferer has a low signal strength, then a conventional detection procedure is selected and performed.

28 Claims, 4 Drawing Sheets

CO-CHANNEL INTERFERENCE CANCELLER

BACKGROUND

The present invention relates to data communication systems. In particular, the invention relates to all areas where channel estimators and equalization methods are used in digital communication. The invention discloses methods and systems for detecting and rejecting a co-channel interferer. The invention is particularly suitable for mobile or base stations in cellular communication systems, but its application is not limited to them.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid raising prices.

In order to increase the capacity in modern Time Division Multiple Access (TDMA) cellular systems, such as Global System for Mobile Communication (GSM) or Enhanced Data rate for GSM Evolutions (EDGE), the cells are decreased in size. This reduction of size implies that the capacity will be interference limited and not sensitivity limited, because near co-channel interferers will dominate the noise figure (i.e., the amount of noise added in a received signal by the environment). Therefore, a significant portion of the noise received by a receiver will not be due to white noise. However, when designing a conventional receiver for a TDMA system, for instance in a mobile phone, the disturbance is often modeled as white noise. Thus, conventional receiver design is optimized for the sensitivity limited case and not for the interference limited case.

Referring to FIG. 1, a block diagram of a conventional TDMA receiver is shown. The received signal is down-converted, filtered, A/D converted and sampled at a symbol rate in the front end receiver (Fe RX) 10. The output from the Fe RX 10 can mathematically be written according to:

$$y_t = \sum_{k=0}^{L} h_k u_{t-k} + e_t = H^T U_t + e_t \quad (1)$$

where $H=[h_0, \ldots, h_L]^T$ is a complex-valued vector representing the radio channel, $U_t=[u_t, \ldots, u_{t-L}]^T$ is a complex-valued vector representing the transmitted symbols (for instance 8-Phase Shift Keying (PSK)), and $e_t$ is some kind of noise often assumed to be white. The received burst is fed to a synchronization and channel estimator unit (Channel Est.) 12 that correlates the received burst, containing a known symbol pattern (i.e., a training sequence) within the burst, with the known training sequence in order to find the synchronization position (i.e., the position within the received burst at which the training sequence starts). After the synchronization position is found, a channel estimation is performed in order to estimate the radio channel taps $\hat{H}$. Standard estimation techniques, such as Least-Squares and the like, can be used to obtain the channel estimate. These techniques are well known in the art. The received burst, the estimated channel $\hat{H}$ and the synchronization position are then fed to an equalizer 14 that detects the transmitted symbols. Conceptually, the equalizer 14 tries to find the symbols minimizing the following:

$$\hat{u}_j = \arg\min_{u \in S} \sum_{t=1}^{N} \left| y_t - \sum_{k=0}^{L} \hat{h}_k \hat{u}_{t-k} \right|^2, j = 1, \ldots, N \quad (2)$$

where S represent the symbol constellation (i.e., the set of symbols define for the given type of modulation, such as 8-PSK). The output from the equalizer is the decided hard symbol, the residuals given as:

$$\varepsilon_t = y_t - \sum_{k=0}^{L} \hat{h}_k \hat{u}_{t-k}$$

and a soft value, representing the uncertainty of the symbol estimate. The above described systems are well known in the art (see, J. Proakis, "Digital Communications", McGraw-Hill Inc., New York, 1995).

The prior art systems do not provide for a co-channel interference-limited scenario (i.e., where the noise $e_t$ is not white). Therefore, there is a need for an efficient method to detect and reject a co-channel interferer.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

The current invention overcomes the prior art limitations by providing a method and apparatus for processing a received signal containing a desired burst and a co-channel interferer burst. The invention comprises receiving the received burst from a front end receiver. A time offset between the desired burst and the co-channel interferer burst is detected. Then, a detection procedure is selected based on the time offset between the desired burst and the co-channel interferer burst. Preferably, one of three detection procedures is selected based on the scenario detected and optionally the signal strength of the co-channel interferer burst. For instance, if a training sequence of the desired burst and a training sequence of the co-channel interferer burst significantly overlap each other (i.e., a first scenario), then a joint detection procedure is selected and performed. If the training signal of the co-channel interferer burst significantly overlaps the desired burst (i.e., a second scenario), then an iterative detection procedure is selected and performed. Finally, if the training signal of the co-channel interferer burst has little or no overlap with the desired burst (i.e., a third scenario) or in some embodiments, if the co-channel interferer has a low signal strength compared to a signal strength of the desired burst, then a conventional (i.e., non-co-channel interference canceling) detection procedure is selected and performed.

The above features and advantages of the present invention will be more apparent and additional features and advantages of the present invention will be appreciated from the following detailed description of the invention made with reference to the drawings.

BRIEF DESCRIPTION OF THE DRAWINGS

The objects and advantages of the invention will be understood by reading the following detailed description in conjunction with the drawings in which.

DETAILED DESCRIPTION

In the following description, for purposes of explanation and not limitation, specific details are set forth, such as particular circuits, circuit components, techniques, and the like in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The invention will be described in connection with a number of exemplary embodiments. To facilitate an understanding of the invention, many aspects of the invention are described in terms of sequences of actions to be performed by elements of a computer-based system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of a computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of an embodiment may be referred to herein as "logic configured to" perform a described action, or alternatively as "logic that" performs a described action.

The exemplary radio communication systems discussed herein are based upon the time division multiple access ("TDMA") protocol, in which communication between the base station and the mobile terminals is performed over a number of time slots. However, those skilled in the art will appreciate that the concepts disclosed herein find use in other protocols, including, but not limited to, frequency division multiple access ("FDMA"), code division multiple access ("CDMA"), or some hybrid of any of the above protocols. Likewise, some of the exemplary embodiments provide illustrative examples relating to the GSM or EDGE type of systems; however, the techniques described herein are equally applicable to radio communication systems operating in accordance with any specification.

Figure 2:
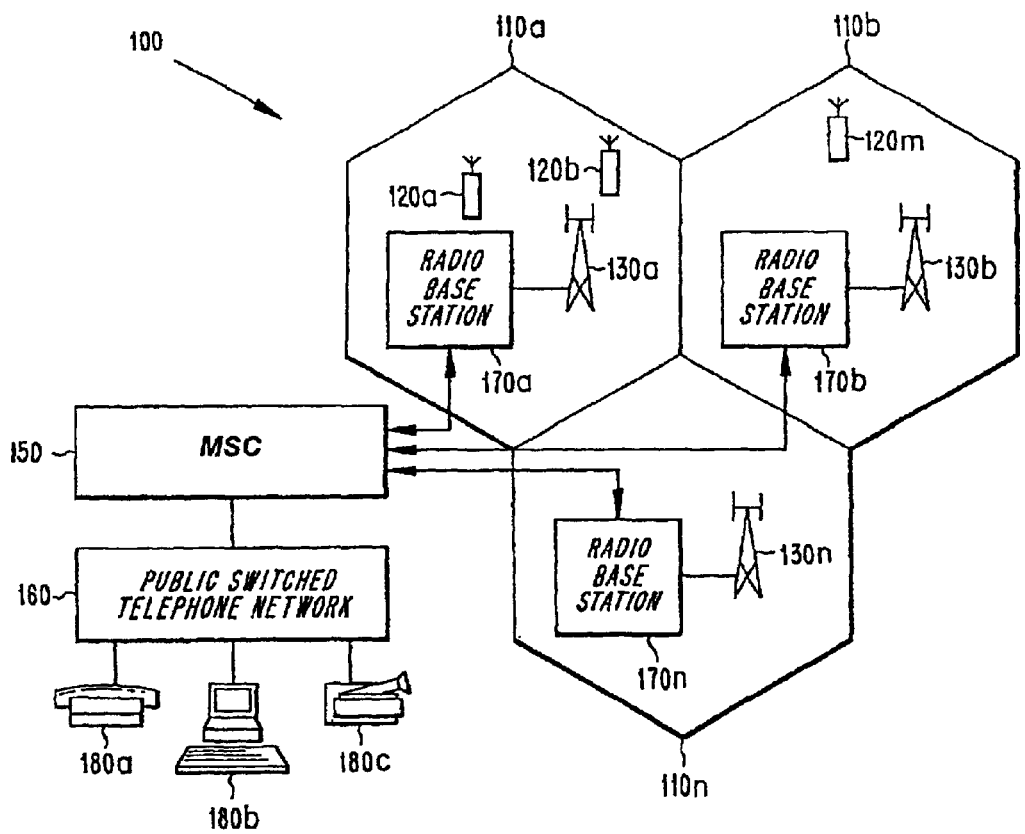
FIG. 2 shows a general radio communication system in which the invention can be implemented.

Prior to discussing exemplary embodiments according to the invention, FIG. 2 will now be described which illustrates a general radio communication system 100 in which the invention can be implemented. The radio communication system 100 includes a plurality of radio base stations 170a–n connected to a plurality of corresponding antennae 130a –n. The radio base stations 170a–n in conjunction with the antennae 130a–n communicate with a plurality of mobile terminals (e.g., terminals 120a, 120b, and 120m) within a plurality of cells 110a–n. Communication from a base station to a mobile terminal is referred to as the downlink, whereas communication from a mobile terminal to the base station is referred to as the uplink.

The base stations are connected to a Mobile Switching Center ("MSC") 150. Among other tasks, the MSC coordinates the activities of the base station, such as during the handoff of a mobile terminal from one cell to another. The MSC 150, in turn, can be connected to a public switched telephone network 160, which services various communication devices 180a, 180b, and 180c. Both the mobile terminals 120a, 120b, and 120m, and the base stations 170a–n can incorporate the co-channel interference canceling system structures and techniques according to the invention.

The invention provides methods and systems for detecting and rejecting a co-channel interferer (CCI) in a communication system, such as the GSM system, EDGE system, and the like. The type of interference rejection technique implemented is based on one or more factors including but not limited to the signal strength of the CCI and the relative time offset between the desired signal and the CCI. For instance, the interference rejection techniques can be based on joint detection or iterative techniques. An example of a joint estimation technique is found in U.S. Pat. No. 5,937,015, entitled "Interference Mitigation by Joint Decoding of Overlapped Signals," which is incorporated by reference herein in its entirety. Optionally, a modulation detection of the CCI is performed before the detecting procedure.

In the following description of the invention, reference numbers will be maintained between drawings where the items referenced are the same. Therefore, reference numbers for a particular figure may not be discussed where the information provided would be redundant.

In a co-channel interference-limited scenario the noise $e_t$ is not white. Assuming one dominant interferer, a model of the received signal is given as:

$$y_t = \sum_{k=0}^{L} h_k u_{t-k} + \sum_{k=0}^{L} g_k v_{t-k} = H^T U_t + G^T V_t \qquad (3)$$

where G is the radio channel of the co-channel interferer and $V_t$ is a vector of symbols transmitted by the co-channel interferer. Therefore, if the co-channel interferer is detected and canceled (i.e., by estimating G and V and subtracting the interferer from the received signal), a performance gain is obtained for the system.

Figure 3A:
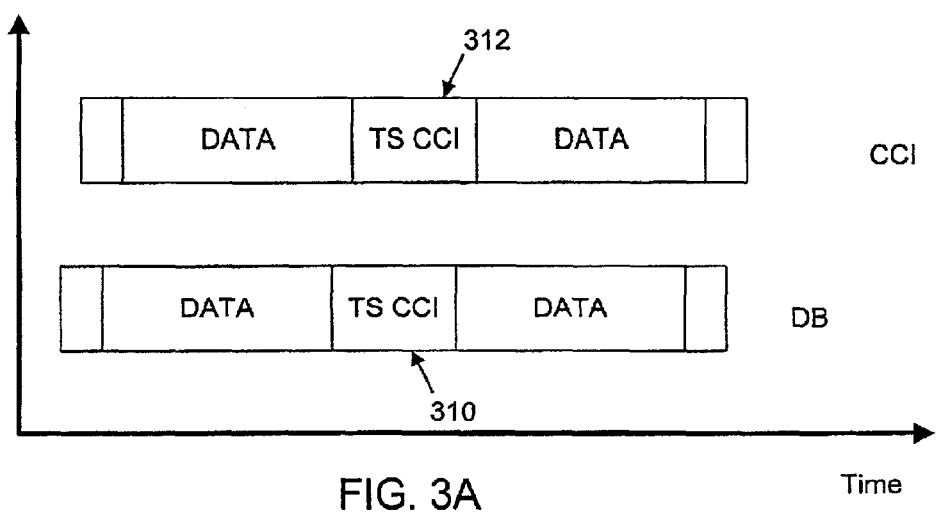
FIG. 3A shows a first time offset between the desired burst and the co-channel interferer burst.
Figure 3B:
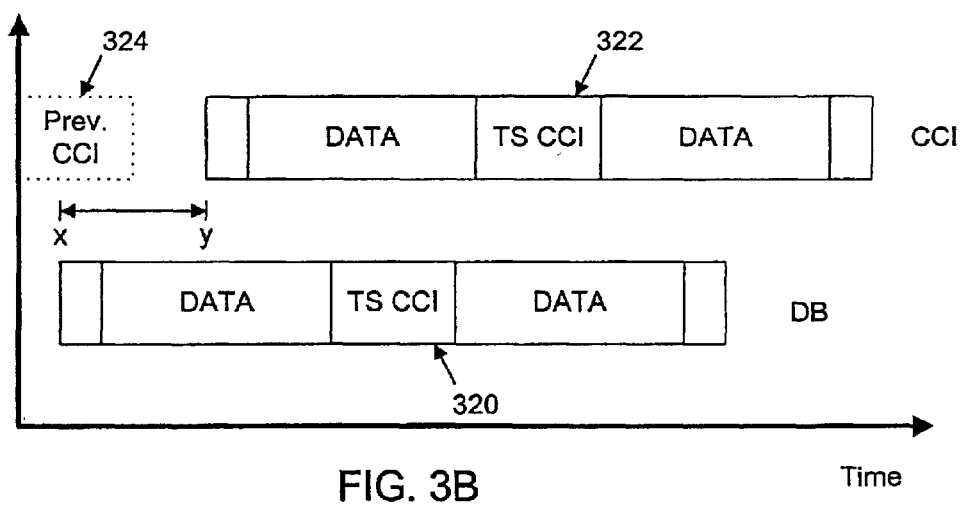
FIG. 3B shows a second time offset between the desired burst and the co-channel interferer burst.
Figure 3C:
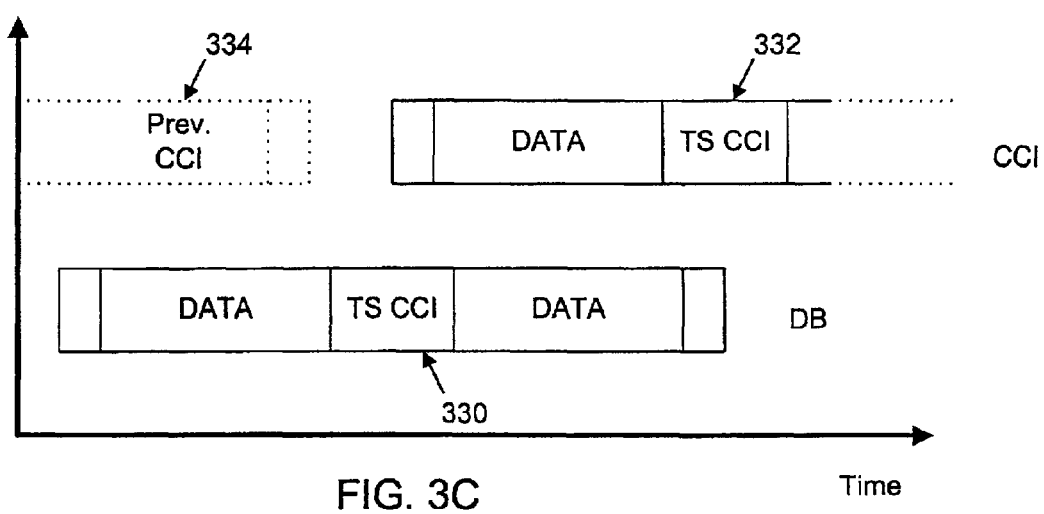
FIG. 3C shows a third time offset between the desired burst and the co-channel interferer burst.

FIGS. 3A–3C show three conceptually different scenarios regarding the time offset between the desired burst and the CCI. In FIG. 3A, a first scenario is shown where a CCI burst 312 is almost synchronized with the desired burst (DB) 310. The CCI burst 312 and DB 310 are received at the antenna almost at the same time. A major part of the CCI training sequence (TS) overlaps the training sequences (TS) of the DB (i.e., about 50% to 100% overlap of the training sequences).

In FIG. 3B, a second scenario is shown where the training sequences of the CCI burst 322 and DB 320 are not significantly overlapping each other. However, there is significant overlap of the CCI burst 322 and DB 320. Generally, in the second scenario, the training sequence for the CCI burst 322 ranges from less than about 50 % overlap of the training sequence DB 320 to greater than about 50% overlap of DB 320 (i.e., more than half of the training sequence of the CCI burst 322 is present during the desired burst 320). A previously transmitted CCI burst 324 only slightly overlaps the DB 320, because of the time offset between DB 320 and CCI burst 324.

In FIG. 3C, a third scenario is shown where a training sequence of CCI burst 332 is outside or almost outside DB 330. Generally, in the third scenario, the training sequence of the CCI burst 332 ranges from less than about 50% overlap of the DB 330 (i.e., less than half of the training sequence of the CCI burst 322 is present during the desired burst 320) to no overlap of DB 320. Also, there may be a significant overlap of a previous CCI burst 334 with DB 330. One skilled in the art will appreciate that the three scenarios are determined by the relative occurrence of the training sequence of the CCI to the desired burst. In accordance with an aspect of the invention, the techniques used to detect the co-channel interferer are selected based upon these three scenarios.

Figure 4:
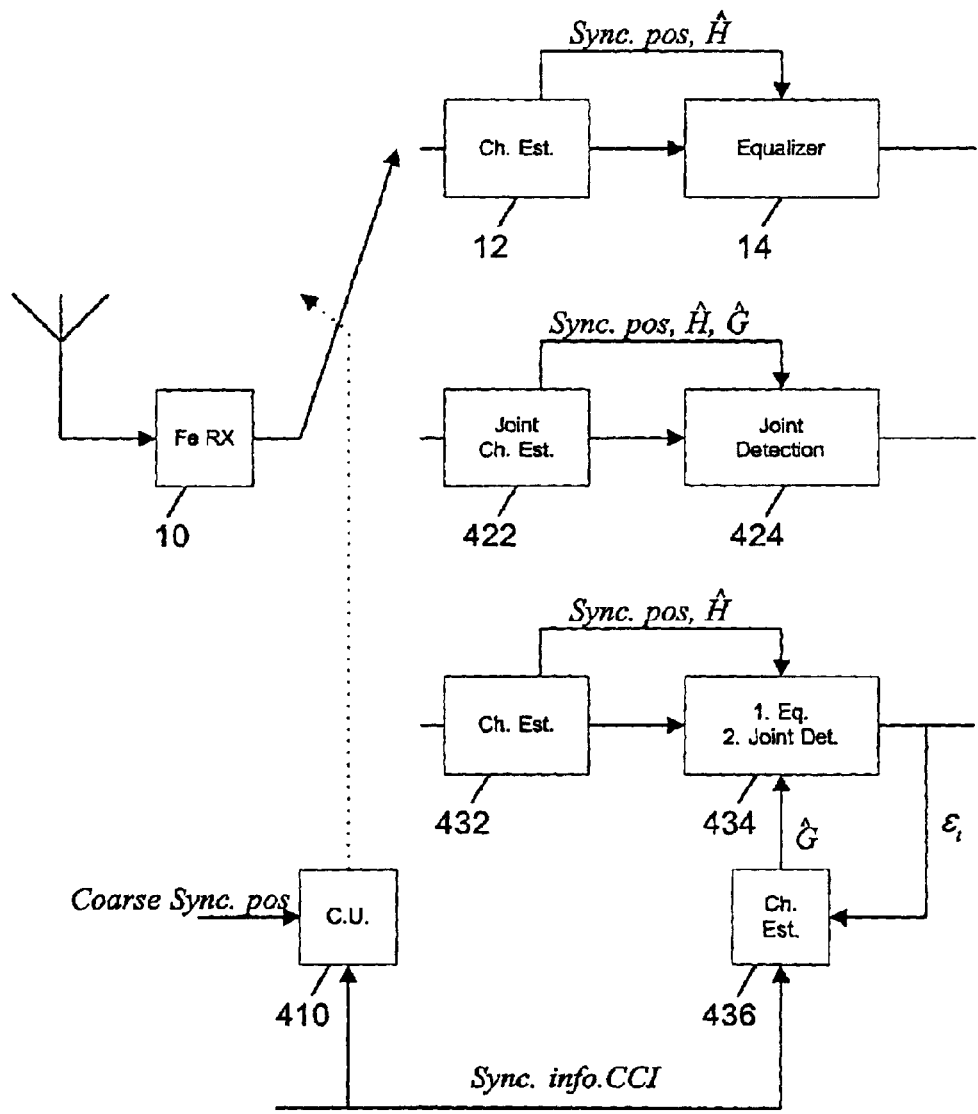
FIG. 4 shows a receiver structure having a co-channel interference canceller.

FIG. 4 is a block diagram of an exemplary embodiment of a receiver that addresses all three scenarios. Different detection techniques are used for different scenarios. Each different scenario will be described below in relation to the section of the receiver that is selected by control unit (C.U.) 410. The received signal is down-converted, filtered, A/D converted and sampled at a symbol rate in the front end receiver (Fe RX) 10. Assuming the desired signal is disturbed by a co-channel interferer, the output (i.e., the received burst) from the front end receiver 10 can mathematically be written as shown in equation (3). In order for the receiver to detect and cancel the co-channel interferer (CCI), it needs to estimate the CCI radio channel (i.e., G) in addition to detecting and estimating the desired radio channel (i.e., H). However, a joint channel estimation and detection are not always possible because the desired burst and the CCI burst are not necessarily synchronized (i.e., the bursts do not arrive at the same time at the receiver's antenna). Therefore, the detection procedure employed by the receiver depends on the time offset between the received bursts. Thus, the control unit (C.U.) 410 selects the detection procedure based on the time offset between the desired burst and the CCI burst. The time offset is defined as a difference between a coarse synchronization position for the desired burst and synchronization position for the CCI burst. For instance, the synchronization position for the desired burst may be based on the synchronization position from the last burst or alternatively may be based on the synchronization position for the present burst. The synchronization position for the CCI burst may be based on Time of Arrival (TOA) information.

Alternatively, the synchronization position for the CCI burst may be based on a long time correlation. Equation (4) below describes one exemplary standard correlation relationship which may be used in conjunction with other steps to effect a synchronization technique for a long time correlation (e.g., for each burst do a correlation between the received burst and the training sequence):

$$c_j(k) = \sum_{i=1}^{N} y_{i+k} u_i^{TS}, k = 0, \ldots, w-1; j = 1, \ldots, NB \quad (4)$$

where $y_i$ is the received signal at time i, $u^{TS}_i$ are the training sequence symbols with the total number of training sequence symbols being N, w is the number of synchronization search windows, and NB is the number of bursts over which the long time correlation is averaged. The energy for each time-lag k can then be computed as:

$$e_j(k) = |c_j(k)|^2$$

The average energy over NB bursts is then calculated as:

$$\text{average}[e(k)] = \sum_{j=1}^{NB} \frac{e_j(k)}{NB}.$$

The synchronization position is then calculated as:

$$\text{Sync. Pos.} = \max_{k} \text{average}[e(k)].$$

Additional techniques are described in U.S. patent application Ser. No. 09/722,749, filed on Nov. 28, 2000 entitled "Using Different Channel Models for Different Training Sequences," which is incorporated by reference herein in its entirety. However, one skilled in the art will appreciate that there are many methods to determine synchronization positions and that the invention is not limited to a particular method.

In the first scenario (see, e.g., FIG. 3A), a joint detection procedure is used because of the overlap of the training sequences of the CCI burst and the desired burst. The received burst containing the training sequences of the desired burst and the CCI burst are fed to a joint channel estimator unit (Joint Ch Est) 422. The joint channel estimator unit 422 correlates both training sequences with the received signal to find an exact synchronization position and then jointly estimates the radio channels H and G. The joint channel estimation is performed using standard Least-Squares techniques or other estimation techniques known in the art. The estimated channels together with the received signal are then fed to an equalizer (joint detection) 424 that jointly detects the desired and interfering symbols. The output from the equalizer 424 is the decided hard symbol, û, the residuals, given as:

$$\varepsilon_t = y_t - \sum_{k=0}^{L} \hat{h}_k \hat{u}_{t-k} - \sum_{k=0}^{L} \hat{g}_k \hat{v}_{t-k}$$

and a soft value, representing the uncertainty of the symbol estimate, $\hat{u}_t$.

In the second scenario (see, e.g., FIG. 3B), an iterative detection scheme is used because of little or no overlap of the CCI training sequence with the training sequence of the desired burst. First a conventional detection of the desired burst is performed (i.e., standard synchronization and channel estimation) in the channel estimation unit (Ch. Est.) 432. Then, the channel estimate Ĥ. the synchronization position (sync. pos.) and the received signal are fed to an equalizer 434. The equalizer 434 uses the channel information to make a first estimate of the transmitted signals, û. The residuals $\varepsilon_t$, given as:

$$\varepsilon_t = y_t - \sum_{k=0}^{L} \hat{h}_k \hat{u}_{t-k} = \sum_{k=0}^{L} g_k v_{t-k} + e_t \quad (4)$$

where $e_t$ represents a noise due to possible erroneous decisions of ûhd t , are output from the equalizer 434 to another channel estimation unit 436 that estimates the CCI radio channel based on the CCI synchronization information and the CCI training sequence. A second channel estimation (i.e., to estimate the CCI channel G) is performed, for example, using standard Least-Squares techniques or other estimation techniques known in the art. Then, the estimated CCI channel, Ĝ, is fed back to the equalizer 434. The equalizer 434 then performs a joint detection of the desired symbols and the CCI symbols, based on the estimated channels Ĥ and Ĝ over a part of the desired burst disturbed by the CCI burst. Outside the part disturbed by the CCI burst (e.g., between x and y as shown in FIG. 3B), an updated conventional equalization is performed. The output from the second detection stage is the updated decided hard symbol, û, the residuals and a soft value, representing the uncertainty of the symbol estimate.

Figure 1:
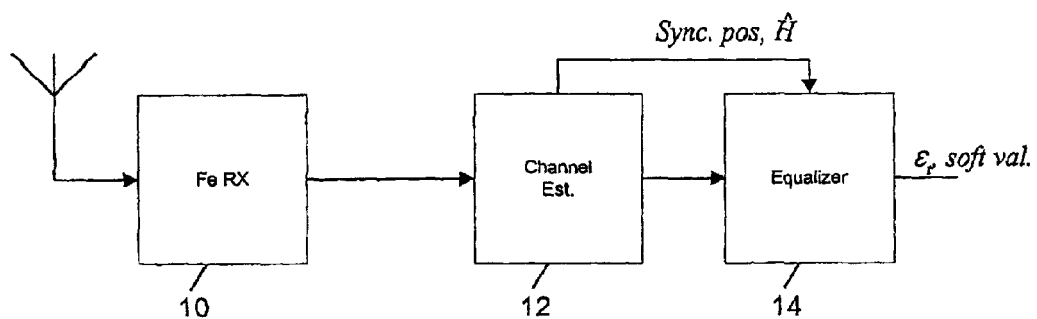
FIG. 1 shows a conventional TDMA receiver structure.

In the third scenario (see, e.g., FIG. 3C), a majority of the CCI training sequence is outside the desired burst. Therefore, it is very difficult to estimate the CCI radio channel because little or no CCI training sequence data is available during the desired burst. Preferably, the control unit 410 decides not to perform any co-channel rejection. Therefore, the decoding procedure will be based on conventional synchronization, channel estimation and equalization procedures as describe in relation to FIG. 1. Optionally, if the signal strength of the CCI is low compared to the signal strength of the desired burst, the control unit 410 will decide not to perform any co-channel detection. For example, in EDGE, if the carrier to interference ratio (C/I) is greater than 20 dB, then only conventional synchronization, channel estimation and equalization procedures are used.

Figure 5:
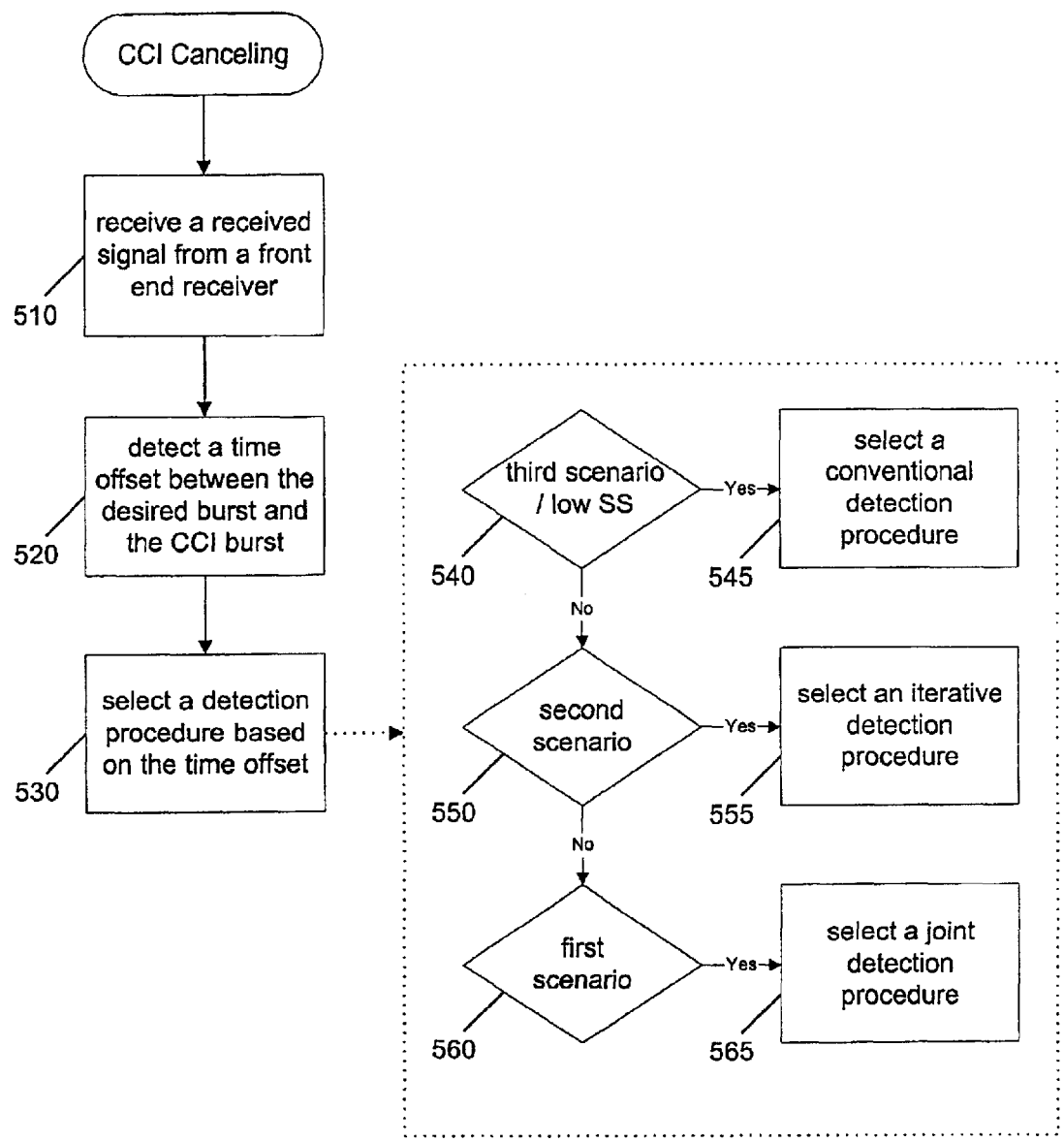
FIG. 5 shows a flowchart illustrating a method of the invention for co-channel interference canceling.

Referring to FIG. 5, a flowchart illustrating an exemplary method of the invention is shown. The method starts by receiving a received signal from a front end receiver, in step 510. The received signal contains both a desired burst and a co-channel interferer burst. In step 520, a time offset between the desired burst and the co-channel interferer burst is detected. Then, in step 530, a detection procedure is selected based on the time offset between the desired burst and the co-channel interferer burst. Preferably, one of three detection procedures is selected based on the time offset detected and optionally the signal strength of the co-channel interferer burst. For instance, in step 540, if the training signal of the co-channel interferer burst has little or no overlap with the desired burst (i.e., a third scenario as illustrated in FIG. 3C) or if the co-channel interferer has a low signal strength compared to a signal strength of the desired burst, then a conventional detection procedure is selected and performed in step 545. In step 550, if the training signal of the co-channel interferer burst significantly overlaps the desired burst (i.e., a second scenario as illustrated in FIG. 3B), then an iterative detection procedure is selected and performed in step 555. An exemplary iterative detection procedure was described above with respect to blocks 432, 434, and 436 in FIG. 4. Finally, in step 560, if the training sequence of the desired burst and the training sequence of the co-channel interferer burst significantly overlap each other (i.e., a first scenario as illustrated in FIG. 3A), then a joint detection procedure is selected and performed in step 565.

The foregoing has described the principles, preferred embodiments and modes of operation of the present invention. However, the invention should not be construed as being limited to the particular embodiments discussed above. For example, in the EDGE system, the modulation for the desired burst and the CCI burst are not known in advance and can vary between bursts. Therefore, a modulation detection must occur before the channel estimation and equalization procedure. Thus, a modulation detection has to be performed on both the desired signal and the CCI. The modulation detection is performed by correlating training sequences for all possible modulations with the received burst in the synchronization stage and then selecting the modulation that provides the best correlation result. One skilled in the art will appreciate that there are many modulation detection techniques well known in the art and that the invention is not limited to a particular technique.

Additionally, the invention can be extended to more than one CCI. For instance, assume two CCIs (i.e., CCI–1 and CCI–2). The number of possible burst overlap scenarios is then increased to nine, as shown in Table 1. Although the number of combinations increases, the process is similar to that described above for the single CCI case. Specifically, the type of detection procedure used (i.e., joint, iterative, or conventional) for each CCI burst is determined by the scenario detected. Therefore, using the coarse synchronization positions of each CCI burst, a time offset between the desired burst and each CCI burst can be determined. The appropriate detection procedure is then selected based on the time offset between the desired burst and each CCI burst. For instance, as shown below in case 1–3, if the scenario detected is the same (i.e., the time offset of both CCI–1 and CCI–2 is about the same) then the detection procedure selected will be the same. However, as shown in cases 4 –9, if the scenario detected is different (i.e., the time offset of both CCI–1 and CCI2 is not the same) then the detection procedure selected will be different for each CCI.

TABLE 1

|  |  | Scenario | | | Detection Procedure | | |
| --- | --- | --- | --- | --- | --- | --- | --- |
|  |  | First | Second | Third | Joint | Iterative | Convent. |
| Case 1 | CCI-1 | 1 |  |  | 1 |  |  |
|  | CCI-2 | 1 |  |  | 1 |  |  |
| Case 2 | CCI-1 |  | 1 |  |  | 1 |  |
|  | CCI-2 |  | 1 |  |  | 1 |  |
| Case 3 | CCI-1 |  |  | 1 |  |  | 1 |
|  | CCI-2 |  |  | 1 |  |  | 1 |
| Case 4 | CCI-1 | 1 |  |  | 1 |  |  |
|  | CCI-2 |  | 1 |  |  | 1 |  |
| Case 5 | CCI-1 | 1 |  |  | 1 |  |  |
|  | CCI-2 |  |  | 1 |  |  | 1 |
| Case 6 | CCI-1 |  | 1 |  |  | 1 |  |
|  | CCI-2 | 1 |  |  | 1 |  |  |
| Case 7 | CCI-1 |  | 1 |  |  | 1 |  |
|  | CCI-2 |  |  | 1 |  |  | 1 |
| Case 8 | CCI-1 |  |  | 1 |  |  | 1 |
|  | CCI-2 | 1 |  |  | 1 |  |  |
| Case 9 | CCI-1 |  |  | 1 |  |  | 1 |
|  | CCI-2 |  | 1 |  |  | 1 |  |

One skilled in the art will appreciate that the number of CCIs processed can be further expanded and is not limited to two. Additionally, as noted above a conventional detection scheme may be selected on any of the CCI's based upon that CCI's signal strength (i.e., if the CCI's signal strength is low compared to a signal strength of the desired burst).

Therefore, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of processing a received signal containing a desired burst and a desired burst and co-channel interferer burst, the method comprising:

receiving the received signal from a front end receiver;

detecting a time offset between the desired burst and the co-channel interferer burst; and selecting a detection procedure based on the time offset between the desired burst and the co-channel interferer burst.

2. The method of claim 1 further comprising:

selecting a joint detection procedure when a training sequence of the desired burst and a training sequence of the co-channel interferer burst overlap by at least a first predetermined amount;

if the training sequence of the desired burst and the training sequence of the co-channel interferer do not overlap each other by at least the first predetermined amount, then selecting an iterative detection procedure when the training sequence of the co-channel interferer burst overlaps the desired burst by a second predetermined amount; and selecting a conventional detection procedure when the training sequence of the co-channel interferer burst does not overlap the desired burst by at least the second predetermined amount.

3. The method of claim 2, wherein the first predetermined amount is about 50%.

4. The method of claim 2, wherein the second predetermined amount is about 50%.

5. The method of claim 2, wherein the joint detection procedure comprises:

finding a synchronization position by correlating the training sequences of the desired burst and the co-channel interferer burst with the received burst;

estimating a first channel and a second channel jointly, thereby generating a first channel estimate and a second channel estimate; and providing the received signal, the first channel estimate, the second channel estimate and the synchronization position to an equalizer, wherein the equalizer jointly detects both desired and co-channel interferer symbols.

6. The method of claim 5 further comprising:

rejecting the co-channel interferer symbols.

7. The method of claim 2, wherein the iterative detection procedure procedure comprises:

estimating a first channel from the received signal, thereby generating a first channel estimate and a first synchronization position;

providing the received signal, the first channel estimate and the first synchronization position to an equalizer, wherein the equalizer performs a first equalization and generates a first estimate of transmitted signals and residuals;

estimating a second channel using the residuals from the first equalization, a synchronization position of the co-channel interferer and a training sequence of the co-channel interferer, thereby generating a second channel estimate;

providing the second channel estimate to the equalizer, wherein the equalizer performs a second equalization over a first part of the desired burst disturbed by the co-channel interferer burst using joint detection based on the first and second channel estimates;

performing a conventional equalization on a second part of the desired burst not disturbed by the co-channel interferer burst; and generating a second estimate of transmitted symbols from the equalization of the first and second parts of the desired burst.

8. The method of claim 1 further comprising:

selecting a conventional detection procedure when the co-channel interferer has a low signal strength compared to a signal strength of the desired burst.

9. The method of claim 1, wherein the time offset is a difference between a coarse synchronization position for the desired burst and a synchronization position for the co-channel interferer.

10. The method of claim 9, wherein the synchronization position for the co-channel interferer is based on a time of arrival.

11. The method of claim 9, wherein the synchronization position for the co-channel interferer is based on a long time correlation.

12. The method of claim 1 further comprising:

detecting a modulation for the desired burst; and detecting a modulation for the co-channel interferer.

13. The method of claim 1 further comprising:

detecting a time offset between the desired burst and at least one additional co-channel interferer burst contained in the received signal; and selecting a detection procedure for the at least one additional co-channel interferer burst based on the time offset between the desired burst and the at least one additional co-channel interferer burst.

14. A receiver comprising:

a front end receiver that outputs a received signal that contains a desired burst and a co-channel interferer burst;

logic that detects a time offset between the desired burst and the co-channel interferer burst; and logic that selects a detection procedure based on the time offset between the desired burst and the co-channel interferer burst.

15. The receiver of claim 14 further comprising:

logic that selects a joint detection procedure when a training sequence of the desired burst and a training sequence of the co-channel interferer burst overlap each other by at least a first predetermined amount;

if the training sequence of the desired burst and the training sequence of the co-channel interferer do not overlap each other by at least the first predetermined amount, then logic that selects an iterative detection procedure when the training sequence of the co-channel interferer burst overlaps the desired burst by a second predetermined amount; and logic that selects a conventional detection procedure when the training sequence of the co-channel interferer burst does not overlap the desired burst by at least the second predetermined amount.

16. The receiver of claim 15, wherein the first predetermined amount is about 50%.

17. The receiver of claim 15, wherein the second predetermined amount is about 50%.

18. The receiver of claim 15, wherein the joint detection section comprises:

logic that finds a synchronization position by correlating the training sequences of the desired burst and the co-channel interferer burst with the received burst;

logic that estimates a first channel and a second channel jointly, thereby generating a first channel estimate and a second channel estimate; and logic that provides the received signal, the first channel estimate, the second channel estimate and the synchronization position to an equalizer, wherein the equalizer jointly detects both desired and co-channel interferer symbols.

19. The receiver of claim 18 further comprising:

logic that rejects the co-channel interferer symbols.

20. The receiver of claim 15, wherein the iterative detection section comprises:

logic that estimates a first channel from the received signal, thereby generating a first channel estimate and a synchronization position;

logic that provides the received burst, the first channel estimate and the synchronization position to an equalizer, wherein the equalizer performs a first equalization and generates a first estimate of desired symbols and residuals;

logic that estimates a second channel using the residuals from the first equalization, a synchronization position of the co-channel interferer and the training sequence of the co-channel interferer, thereby generating a second channel estimate;

logic that provides the second channel estimate to the equalizer, wherein the equalizer performs a second equalization over a first part of the desired burst disturbed by the co-channel interferer burst using joint detection based on the first and second channel estimates;

logic that performs a conventional equalization on a second part of the desired burst not disturbed by the co-channel interferer burst; and logic that generates a second estimate of desired symbols from the equalization of the first and second parts of the desired burst.

21. The receiver of claim 14 further comprising:

logic that selects a conventional detection section when the co-channel interferer has a low signal strength compared to a signal strength of the desired burst.

22. The receiver of claim 14, wherein the time offset is a difference between a coarse synchronization position for the desired burst and a synchronization position for the co-channel interferer.

23. The receiver of claim 22, wherein the synchronization position for the co-channel interferer is based on a time of arrival.

24. The receiver of claim 22, wherein the synchronization position for the co-channel interferer is based on a long time correlation.

25. The receiver of claim 14 further comprising:

logic that detects a modulation for the desired burst; and logic that detects a modulation for the co-channel interferer.

26. The receiver of claim 14, wherein the receiver is a base station receiver.

27. The receiver of claim 14, wherein the receiver is a mobile terminal receiver.

28. The receiver of claim 14 further comprising:

logic that detects a time offset between the desired burst and at least one additional co-channel interferer burst contained in the received signal; and logic that selects a detection procedure for the at least one additional co-channel interferer burst based on the time offset between the desired burst and the at least one additional co-channel interferer burst.

* * * * *

UNITED STATES PATENT AND TRADEMARK OFFICE
CERTIFICATE OF CORRECTION

PATENT NO.    : 6,842,476 B2
DATED         : January 11, 2005
INVENTOR(S)   : Bengt Lindoff et al.

It is certified that error appears in the above-identified patent and that said Letters Patent is hereby corrected as shown below:

Column 1,
Line 50, change "$H=[h_0,\ldots, h_l]^T$" to -- $H=[h_0, \ldots, h_L]^T$ --

Column 5,
Line 65, change "$u^{TS}_i$" to -- $u^{TS}_i$ --

Column 6,
Line 15, change "Sync. Pos= maxaverage [e(k)]."
                              k
to -- Sync. Pos. = max average[e(k)]. --
                    k
Line 55, change "$\hat{H}$." to -- $\hat{H}$, --
Line 66, change "ûhd t," to -- $\hat{u}_t$, --

Column 8,
Line 26, change "case" to -- cases --
Line 31, change "CC12" to -- CC1-2 --

Column 9,
Line 3, delete the second instance of "desired burst and"
Line 14, after "overlap" insert -- each other --
Line 45, delete the second instance of "procedure"

Signed and Sealed this

Fourteenth Day of June, 2005

JON W. DUDAS
*Director of the United States Patent and Trademark Office*